(12) United States Patent
Tsuchida

(10) Patent No.: US 10,746,536 B2
(45) Date of Patent: Aug. 18, 2020

(54) OPTICAL DISPLACEMENT METER

(71) Applicant: Keyence Corporation, Osaka (JP)

(72) Inventor: Yoshitaka Tsuchida, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/512,467

(22) Filed: Jul. 16, 2019

(65) Prior Publication Data

US 2020/0049490 A1     Feb. 13, 2020

(30) Foreign Application Priority Data

Aug. 13, 2018 (JP) ................................ 2018-152482

(51) Int. Cl.
*G01B 11/24* (2006.01)
*G01B 11/14* (2006.01)

(52) U.S. Cl.
CPC .............. *G01B 11/24* (2013.01); *G01B 11/14* (2013.01)

(58) Field of Classification Search
CPC ................................ G01B 11/24; G01B 11/14
USPC .......................... 356/601, 602, 612, 614, 623
See application file for complete search history.

(56) References Cited

U.S. PATENT DOCUMENTS

| | | | | |
|---|---|---|---|---|
| 6,064,759 A * | 5/2000 | Buckley | ................ | G01B 11/024 348/125 |
| 7,253,908 B2 * | 8/2007 | Vaccaro | ................. | G01B 11/24 356/607 |
| 7,489,410 B2 * | 2/2009 | Nishio | ................. | G01B 11/026 356/614 |
| 7,667,857 B2 * | 2/2010 | Nishio | ................. | G01B 11/026 356/606 |
| 9,866,747 B2 * | 1/2018 | Satoyoshi | ............. | G01B 11/24 |
| 10,225,544 B2 * | 3/2019 | Thuries | ................ | G06K 9/2036 |
| 2008/0088856 A1 * | 4/2008 | Nishio | ................. | G01B 11/026 356/623 |
| 2008/0094643 A1 * | 4/2008 | Nishio | ................. | G01B 11/026 356/623 |
| 2009/0141288 A1 * | 6/2009 | Nishio | ................. | G01B 11/026 356/614 |
| 2012/0154807 A1 * | 6/2012 | Usami | ................. | G01B 11/026 356/369 |

(Continued)

FOREIGN PATENT DOCUMENTS

JP     2013-170841 A     9/2013

OTHER PUBLICATIONS

U.S. Appl. No. 16/512,462, filed Jul. 16, 2019 (77 pages).

*Primary Examiner* — Roy M Punnoose
(74) *Attorney, Agent, or Firm* — Kilyk & Bowersox, P.L.L.C.

(57) ABSTRACT

There is provided an optical displacement meter capable of accurately measuring a profile of a measurement object even when multiple reflections are caused. At the time of setting, reference data indicating a reference profile of a measurement object is registered by a registration unit, and a mask region is set to the reference data by a setting unit. At the time of measurement, reflected light from the measurement object is received by a light receiving unit, and a peak in an output light receiving amount distribution is detected by a peak detection unit. Temporary profile data of the measurement object is generated by a profile generation unit based on a position of the detected peak. A position of the mask region for the temporary profile is corrected by a correction unit.

6 Claims, 12 Drawing Sheets

(56) References Cited

U.S. PATENT DOCUMENTS

2016/0261791 A1* 9/2016 Satoyoshi .......... H04N 5/23293
2020/0049487 A1* 2/2020 Tsuchida ............... G01S 7/4815

* cited by examiner

PROFILE DATA

OPTICAL DISPLACEMENT METER

CROSS-REFERENCE TO RELATED APPLICATIONS

The present application claims foreign priority based on Japanese Patent Application No. 2018-152482, filed Aug. 13, 2018, the contents of which is incorporated herein by reference.

BACKGROUND OF THE INVENTION

1. Field of the Invention

The present invention relates to an optical displacement meter that detects a displacement of a measurement object by a triangulation method.

2. Description of Related Art

In an optical displacement meter using an optical cutting method, a measurement object (hereinafter, referred to as a workpiece) is irradiated with band-shaped light having a line-shaped cross section, and reflected light is received by a two-dimensional light receiving element. A profile of the workpiece is measured based on a position of a peak of a light receiving amount distribution obtained by the light receiving element. Here, the light irradiated onto the workpiece may be multiple-reflected on a surface of the workpiece. In this case, since a plurality of peaks appears in the light receiving amount distribution due to the incidence of the multiple-reflected light on the light receiving element, it is impossible to measure an accurate profile of the workpiece. The same problem occurs when light (disturbance light) from a portion other than the light projecting unit is incident on the light receiving element or when light reflected from a portion other than a measurement target portion of the workpiece is incident on the light receiving element.

JP-A-2013-170841 discloses an optical displacement meter capable of setting a shielding frame to a light receiving amount distribution displayed on a display unit. In this optical displacement meter, the profile is measured based on the position of the peak obtained by excluding a portion of the light receiving amount distribution in the set shielding frame.

Therefore, when a portion where an unnecessary peak occurs in the light receiving amount distribution is known, a user sets the shielding frame to the portion. As a result, even when the unnecessary peak occurs in the light receiving amount distribution, it is possible to measure an accurate profile of the workpiece as long as a positional deviation does not occur in the workpiece.

As described in JP-A-2013-170841, when the positional deviation occurs on the workpiece, the shielding frame cannot be moved according to the positional deviation of the workpiece. Therefore, when a portion of the light receiving amount distribution in which the unnecessary peak occurs moves out of the shielding frame due to positional deviation of the workpiece or when a portion of the light receiving amount distribution in which the unnecessary peak does not occur moves within the shielding frame, it is impossible to measure an accurate profile of the workpiece.

SUMMARY OF THE INVENTION

An object of the present invention is to provide an optical displacement meter capable of accurately measuring a profile of a measurement object.

(1) An optical displacement meter according to the present invention is an optical displacement meter using an optical cutting method, which measures a profile of a measurement object. The meter includes a light projecting unit that irradiates the measurement object with split light which spreads in a first direction or spot light scanned in the first direction, a light receiving unit that includes a plurality of pixels arranged in the first direction and a second direction intersecting with the first direction, receives reflected light from each position of the measurement object in the first direction, and outputs a light receiving amount distribution, a registration unit that registers reference data indicating a reference profile serving as a reference of the profile of the measurement object at the time of setting, a setting unit that sets a mask region for indicating a portion at which a light receiving amount is to be ignored in the light receiving amount distribution output from the light receiving unit to the reference data at the time of setting, a peak detection unit that detects a position of a peak of a light receiving amount in the second direction in each pixel column based on a plurality of light receiving amount distributions respectively output from a plurality of pixel columns arranged in the first direction at the time of measurement, a profile generation unit that generates temporary profile data of the measurement object based on a position of a peak in each of the plurality of light receiving amount distributions detected by the peak detection unit at the time of measurement, and a correction unit that specifies a positional deviation amount between the reference profile and a temporary profile based on the temporary profile data, and corrects a position of the mask region for the temporary profile based on the specified positional deviation amount at the time of measurement. The peak detection unit detects the position of the peak in the second direction again by excluding the light receiving amount in the mask region corrected by the correction unit from each of the plurality of light receiving amount distributions which respectively corresponds to the plurality of pixel columns at the time of measurement, and the profile generation unit generates true profile data of the measurement object based on the position of the peak detected again by the peak detection unit at the time of measurement.

In this optical displacement meter, the reference data indicating the reference profile serving as the reference of the profile of the measurement object is registered by the registration unit at the time of setting. In addition, the mask region for indicating the portion at which the light receiving amount is to be ignored in the light receiving amount distribution output from the light receiving unit is set to the reference data by the setting unit.

At the time of measurement, the slit light which spreads in the first direction or the spot light is scanned in the first direction and is irradiated onto the measurement object by the light projecting unit. The reflected light from the measurement object is received by the plurality of pixel columns arranged in the first direction in the light receiving unit, and the light receiving amount distribution is output. In each pixel column, the plurality of pixels is arranged in the second direction. The peak detection unit detects the position of the peak of the light receiving amount in the second direction for each pixel column based on the plurality of light receiving amount distributions output by the plurality of pixel columns. The temporary profile data of the measurement object is generated by the profile generation unit based on the position of the peak in each of the plurality of detected light receiving amount distributions.

Thereafter, the positional deviation amount between the reference profile and the temporary profile based on the temporary profile data is specified by the correction unit, and the position of the mask region for the temporary profile is corrected based on the specified positional deviation amount. The position of the peak in the second direction is detected again by the peak detection unit by excluding the light receiving amount in the mask region corrected from each of the plurality of light receiving amount distributions corresponding to the plurality of pixel columns. The true profile data of the measurement object is generated by the profile generation unit based on the position of the peak detected again.

With this configuration, when an unnecessary peak occurs in the light receiving amount distribution, it is possible to generate the true profile data indicating the true profile of the measurement object while ignoring the light receiving amount in the mask region by setting the mask region at the portion of the reference profile corresponding to the portion of the light receiving amount distribution. Here, the temporary profile data indicating the temporary profile of the measurement object is generated before the true profile data is generated. Therefore, even when the positional deviation occurs on the measurement object from the reference profile, the position of the mask region is corrected based on the positional deviation between the reference profile and the temporary profile, and the mask region moves in accordance with the positional deviation of the measurement object.

Therefore, even when the positional deviation occurs on the measurement object, a portion at which an unnecessary peak occurs is prevented from moving out of the mask region. Similarly, a portion at which the unnecessary peak does not occur is prevented from moving into the mask region. As a result, the mask region can be set up to the nearest of the reference profile within a range that does not overlap the reference profile. As a result, even when the unnecessary peak occurs in the light receiving amount distribution, it is possible to accurately measure the profile of the measurement object.

(2) The setting unit may further set a detection region for detecting a positional deviation between a portion of the temporary profile and the reference profile to the reference data at the time of setting, and the correction unit may specify a positional deviation amount between a portion of the reference profile within the detection region and a portion of the temporary profile corresponding to the portion of the reference profile at the time of measurement. In this case, it is possible to easily and quickly specify the positional deviation amount between the reference profile and the temporary profile.

(3) At the time of measurement, when positions of a plurality of the peaks are detected for the light receiving amount distribution corresponding to any pixel column by the peak detection unit, the profile generation unit may determine one peak position from the positions of the plurality of peaks in the light receiving amount distribution based on a preset condition, and may generate the temporary profile data based on the determined position of the peak. In this case, it is possible to easily generate the temporary profile data.

(4) The preset condition may include a condition in which a position of a peak having a maximum light receiving amount is determined as the position of the one peak from the positions of the plurality of peaks in each light receiving amount distribution. In some shapes of the measurement object, the position of the peak having the maximum light receiving amount may coincide with the position of the surface of the measurement object. In such a case, it is possible to easily generate the temporary profile data that relatively accurately indicates the temporary profile of the measurement object.

(5) The preset condition may further include a condition in which a position of a peak closest to one end or the other end in the second direction is determined as the position of the one peak from the positions of the plurality of peaks in each light receiving amount distribution. In some shapes of the measurement object, the position of the peak closest to one end or the other end in the second direction may coincide with the position of the surface of the measurement object. In such a case, it is possible to easily generate the temporary profile data that relatively accurately indicates the temporary profile of the measurement object.

(6) The optical displacement meter may further include a filter processing unit that performs filter processing on the true profile data such that a smoothing effect becomes larger as a change of a value becomes smaller at each portion of the true profile data generated by the profile generation unit. In this case, it is possible to smooth the portion of the true profile corresponding to the flat portion of the measurement object while maintaining the shape of the stepped portion and the edge portion in the true profile.

According to the present invention, it is possible to accurately measure the profile of the measurement object.

DESCRIPTION OF EMBODIMENTS (1) Configuration of Optical Displacement Meter

Figure 1:
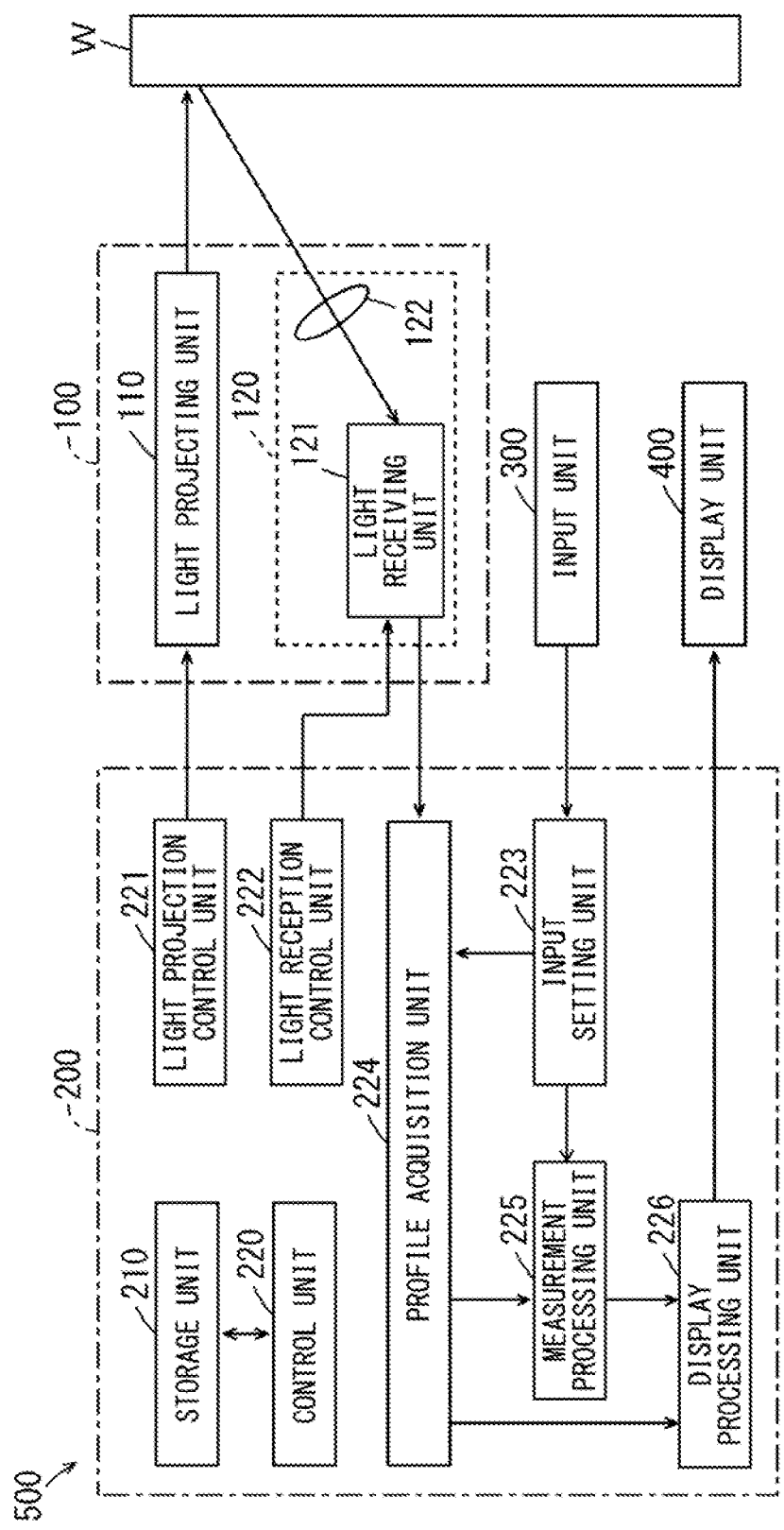
FIG. 1 is a block diagram showing a configuration of an optical displacement meter according to an embodiment of the present invention.

Hereinafter, an optical displacement meter using an optical cutting method will be described as an optical displacement meter according to an embodiment of the present invention with reference to the drawings. FIG. 1 is a block diagram showing a configuration of an optical displacement meter according to an embodiment of the present invention. As shown in FIG. 1, an optical displacement meter 500 includes an imaging head 100, a processing device 200, an input unit 300, and a display unit 400. The optical displacement meter 500 may include a plurality of imaging heads 100. The imaging head 100 is configured to be detachable from the processing device 200. The imaging head 100 and the processing device 200 may be integrally provided.

The imaging head 100 includes a light projecting unit 110 and an imaging unit 120. The light projecting unit 110 is configured to be able to irradiate a measurement object (hereinafter, referred to as a workpiece W) with band-shaped light that spreads in one direction (an X1 direction to be described later). The light projecting unit 110 may be configured to be capable of irradiating the workpiece W with light scanned in one direction instead of using the band-shaped light that spreads in one direction.

The imaging unit 120 includes a light receiving unit 121 and a light receiving lens 122. Reflected light from the workpiece W passes through the light receiving lens 122, and is incident on the light receiving unit 121. The light receiving unit 121 includes, for example, a complementary metal-oxide-semiconductor (CMOS) sensor, and has a plurality of two-dimensionally arranged pixels. A light receiving amount distribution of the light receiving unit 121 is output as digital data.

The processing device 200 includes a storage unit 210 and a control unit 220. The processing device 200 includes, as functional units, a light projection control unit 221, a light reception control unit 222, an input setting unit 223, a profile acquisition unit 224, a measurement processing unit 225, and a display processing unit 226.

The storage unit 210 includes a random access memory (RAM), a read only memory (ROM), a hard disk, a semiconductor memory, or the like, and stores a measurement program. The control unit 220 is, for example, a central processing unit (CPU). The control unit 220 executes the measurement program stored in the storage unit 210, thereby realizing the functional units of the processing device 200. Part or all of the functional units of the processing device 200 may be realized by hardware such as electronic circuits.

The light projection control unit 221 controls a light irradiation timing, light intensity, and the like of the light projecting unit 110. The light reception control unit 222 controls a light receiving timing and the like of the light receiving unit 121. The input setting unit 223 provides a command signal to the profile acquisition unit 224, and the measurement processing unit 225 based on the command signal given by the input unit 300.

The profile acquisition unit 224 acquires profile data indicating the profile of the workpiece W based on the light receiving amount distribution output from the light receiving unit 121 and the command signal given from the input setting unit 223. Details of the profile acquisition unit 224 will be described later.

The measurement processing unit 225 performs measurement processing on the profile data acquired by the profile acquisition unit 224 based on the command signal given from the input setting unit 223. Here, the measurement process is a process of calculating a dimension (displacement) of any portion of the surface of the workpiece W based on the profile data. The display processing unit 226 generates image data indicating a shape of the workpiece W based on the profile data and the dimension (displacement), calculated by the measurement processing, and provides the generated image data to the display unit 400.

The input unit 300 includes a keyboard and a pointing device, and is configured to be operable by a user. A mouse, a joystick, or the like is used as the pointing device. A dedicated console may be used as the input unit 300. The user operates the input unit 300, and thus, a command signal is given from the input unit 300 to the input setting unit 223 of the processing device 200.

The display unit 400 is, for example, a liquid crystal display panel or an organic electroluminescence (EL) panel. The display unit 400 displays the profile of the workpiece W and the measurement result by the measurement processing unit 225 based on the image data provided by the display processing unit 226 of the processing device 200.

(2) Overview of Operation

Figure 2:
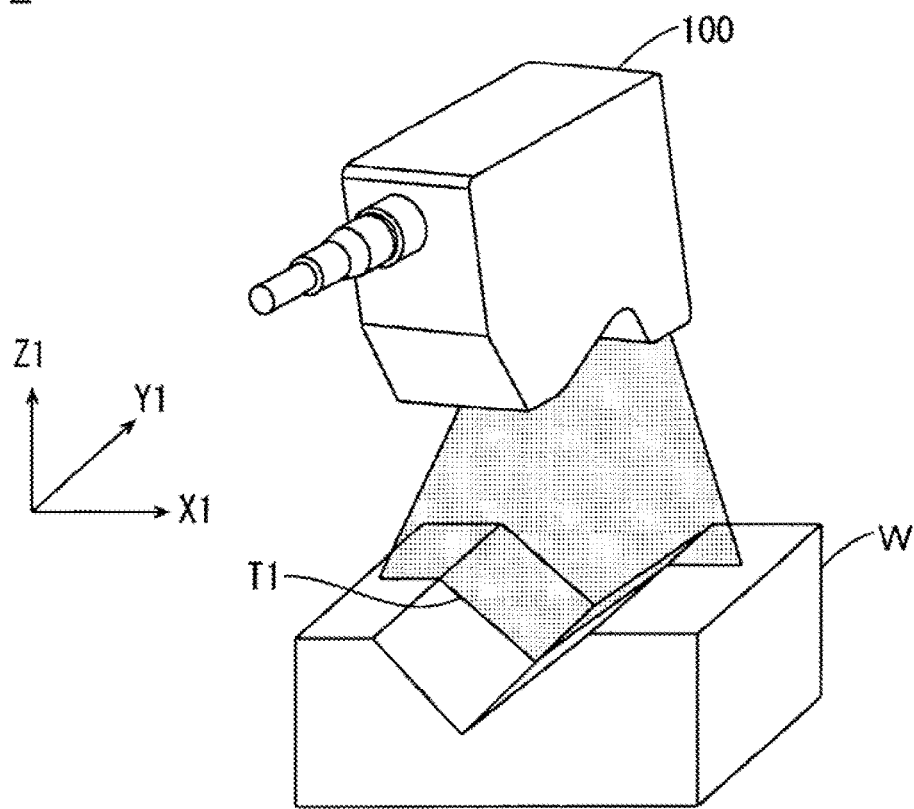
FIG. 2 is an external perspective view of an imaging head and a workpiece.
Figure 3:
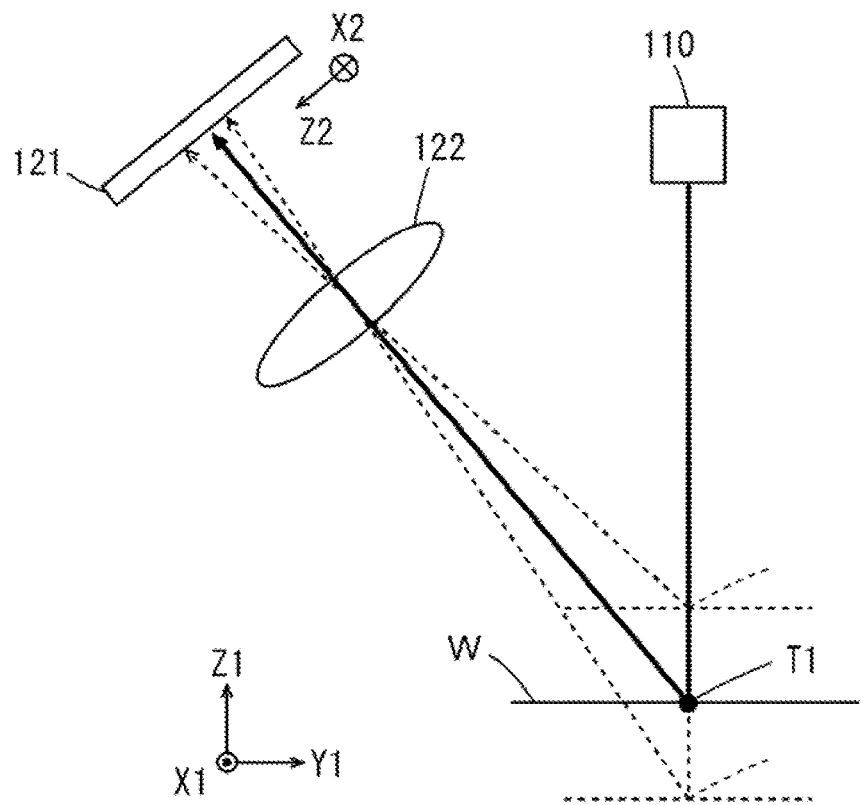
FIG. 3 is a diagram showing the relationship between a light irradiation position on a workpiece surface and a light incident position on a light receiving unit.
Figure 4:
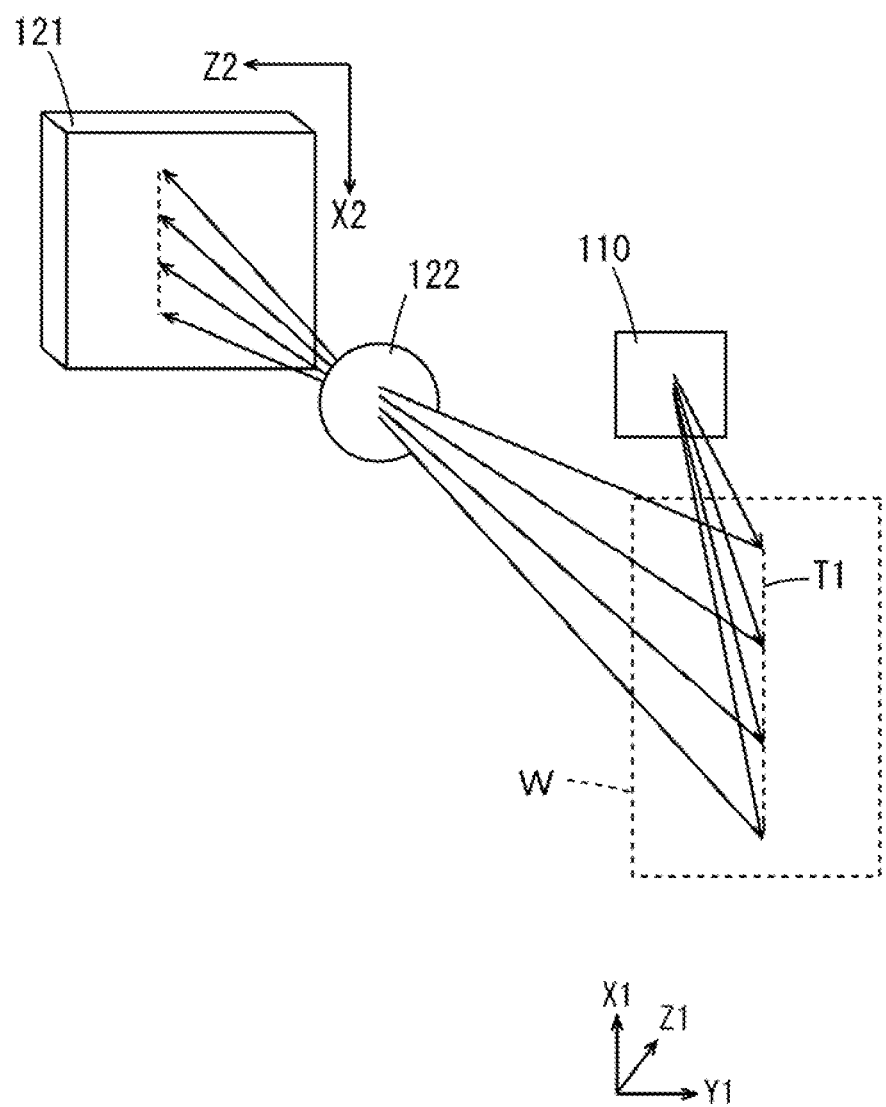
FIG. 4 is a diagram showing the relationship between the light irradiation position on the workpiece surface and the light incident position on the light receiving unit.

FIG. 2 is an external perspective view of the imaging head 100 and the workpiece W. FIGS. 3 and 4 are diagrams showing the relationship between a light irradiation position on the surface of the workpiece W and a light incident position on the light receiving unit 121. In FIGS. 2 to 4, two directions orthogonal to each other in a horizontal plane are defined as an X1 direction and a Y1 direction, and are indicated by arrows X1 and Y1, respectively. A vertical direction is defined as a Z1 direction and is indicated by an arrow Z1. In FIGS. 3 and 4, two directions orthogonal to each other on a light receiving surface of the light receiving unit 121 are defined as an X2 direction and a Z2 direction, and are indicated by arrows X2 and Z2, respectively. Here, the light receiving surface is a surface formed by the plurality of pixels of the light receiving unit 121.

In the example of FIG. 2, a groove having a V-shaped cross section extending in an Y1 direction is formed in the surface of the workpiece W. The imaging head 100 irradiates the surface of the workpiece W with band-shaped light along an X1 direction. Hereinafter, a line-shaped region on the surface of the workpiece W onto which band-shaped light is irradiated is referred to as an irradiation region T1. As shown in FIG. 3, light reflected from the irradiation region T1 passes through the light receiving lens 122, and is incident on the light receiving unit 121. In this case, when a reflection position of the light in the irradiation region T1 is different in a Z1 direction, an incident position of the reflected light to the light receiving unit 121 is different in a Z2 direction.

As shown in FIG. 4, when the reflection position of the light in the irradiation region T1 is different in the X1 direction, the incident position of the reflected light to the light receiving unit 121 is different in the X2 direction. Accordingly, the incident position of the light to the light receiving unit 121 in the Z2 direction represents the position (height) of the irradiation region T1 in the Z1 direction, and the incident position of the light to the light receiving unit 121 in the X2 direction represents the position of the irradiation region T1 in the X1 direction.

Figure 5:
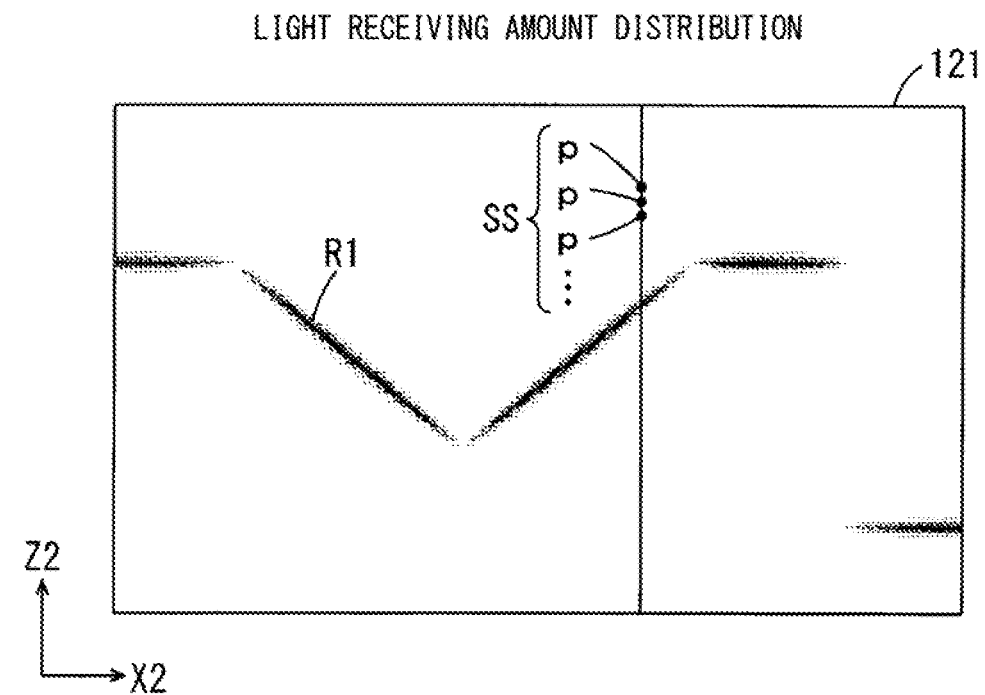
FIG. 5 is a diagram showing a light receiving amount distribution on the light receiving surface of the light receiving unit.

FIG. 5 is a diagram showing a light receiving amount distribution on the light receiving surface of the light receiving unit 121. The light receiving amount distribution is generated based on a light receiving amount of each pixel p of the light receiving unit 121 in FIG. 5. The plurality of pixels p of the light receiving unit 121 is two-dimensionally arranged along the X2 direction and the Z2 direction. Each of columns of the plurality of pixels p along the Z2 direction is referred to as a pixel column SS. Therefore, a plurality of pixel columns SS is arranged in the X2 direction on the light receiving surface of the light receiving unit 121, and each pixel column SS includes the plurality of pixels p along the Z2 direction.

Each pixel p in the present invention is not limited to one pixel (the smallest unit of pixels) of an imaging device such as a CMOS sensor, and may include a plurality of pixels. For example, each pixel p may include four pixels arranged in 2×2, or each pixel p may include nine pixels arranged in 3×3. Therefore, when binning processing is performed with a plurality of pixels as one unit, each pixel p may include a plurality of pixels included in the one unit.

The light reflected from the irradiation region T1 in FIG. 2 is incident on a light receiving region R1 shown in FIG. 5. As a result, a light receiving amount of the light receiving region R1 increases. The light receiving amount distribution of FIG. 5 is output as digital data for each pixel column SS.

Figure 6:
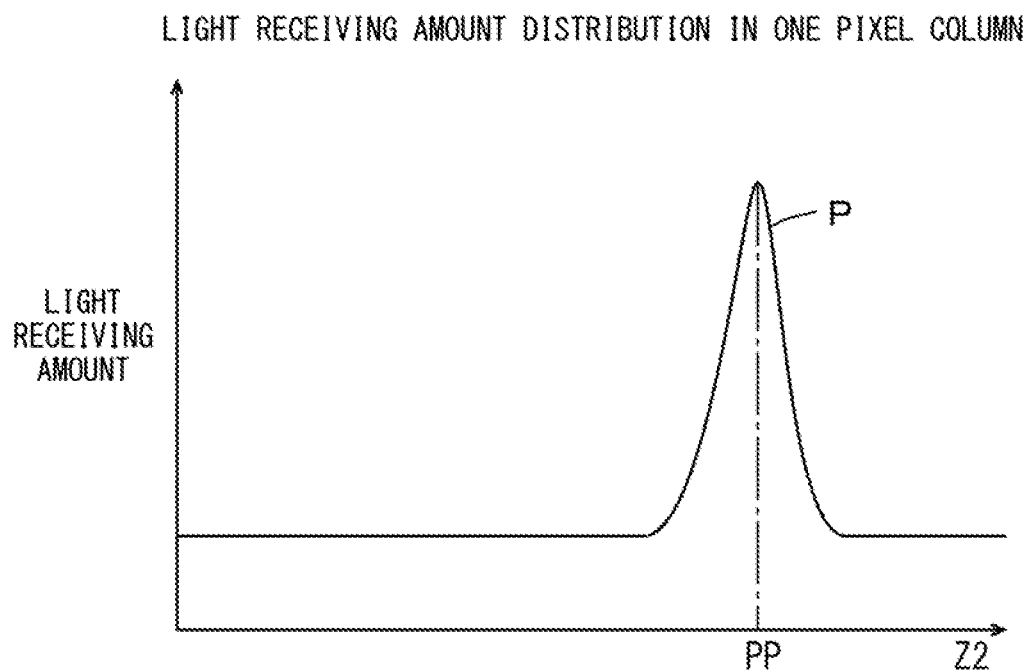
FIG. 6 is a diagram showing a light receiving amount distribution in one pixel column of FIG. 5.

FIG. 6 is a diagram showing a light receiving amount distribution in one pixel column SS of FIG. 5. In FIG. 6, a horizontal axis represents a position in the Z2 direction, and a vertical axis represents a light receiving amount. As shown in FIG. 6, a peak P (local maximum value) corresponding to the light receiving region R1 in FIG. 5 appears in the light receiving amount distribution in one pixel column SS. A position of the peak P in the Z2 direction (hereinafter, referred to as a peak position PP) indicates a height of a surface (reflective surface) of the workpiece W in the irradiation region T1.

One or more peak positions PP (one in the example of FIG. 6) in each of a plurality of light receiving amount distributions corresponding to the plurality of pixel columns SS are detected by the profile acquisition unit 224 of FIG. 1. Profile data indicating the profile of the workpiece W (the shape of the irradiation region T1) is acquired by the profile acquisition unit 224 based on the plurality of peak positions PP.

Figure 7:
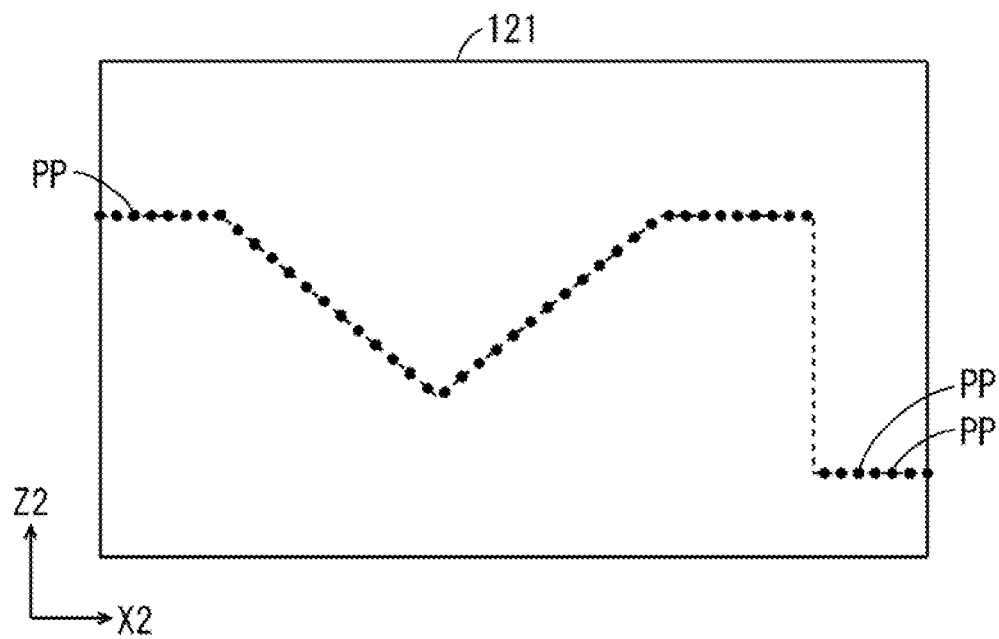
FIG. 7 is a diagram showing all peak positions in the light receiving amount distribution of FIG. 5.
Figure 8:
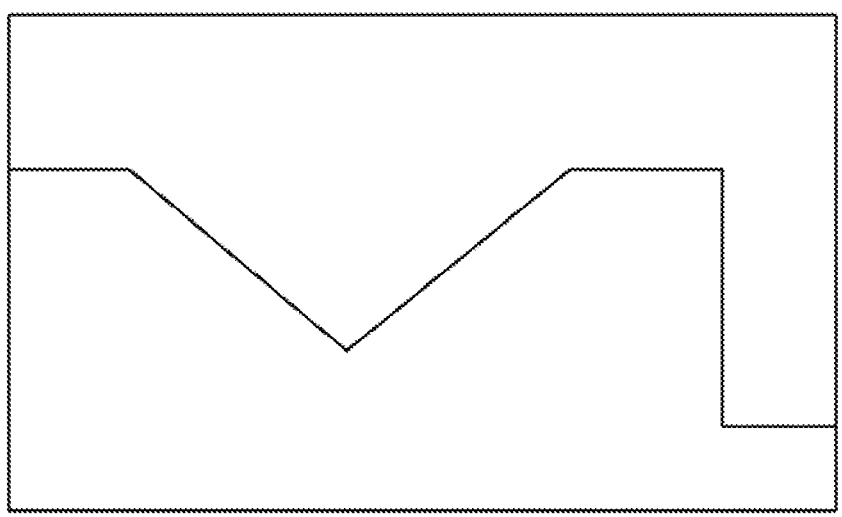
FIG. 8 is a diagram showing profile data acquired based on the peak position of FIG. 7.

FIG. 7 is a diagram showing all the peak positions PP in the light receiving amount distribution of FIG. 5. FIG. 8 is a diagram showing the profile data acquired based on the peak position PP of FIG. 7. As shown in FIGS. 7 and 8, all the detected peak positions PP are shown as continuous lines, and thus, the profile data indicating the profile of the workpiece W is obtained.

Figure 9A:
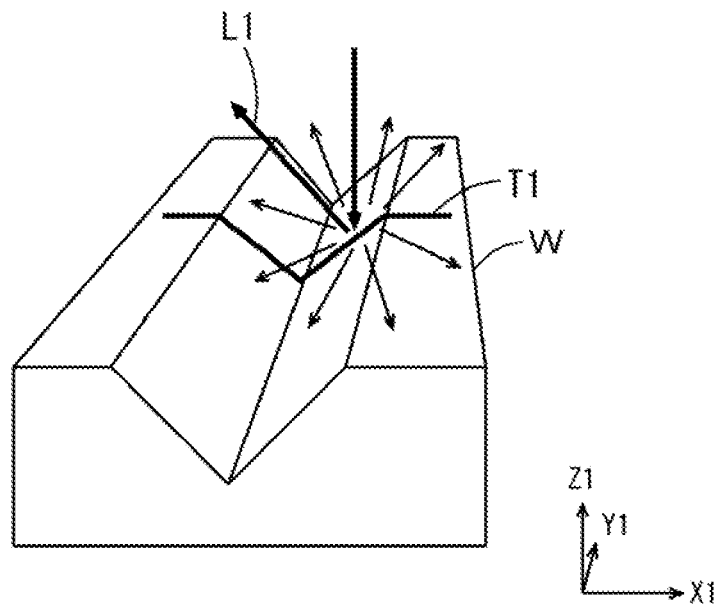
FIGS. 9A and 9B are diagrams for describing reflections on the surface of a workpiece.
Figure 9B:
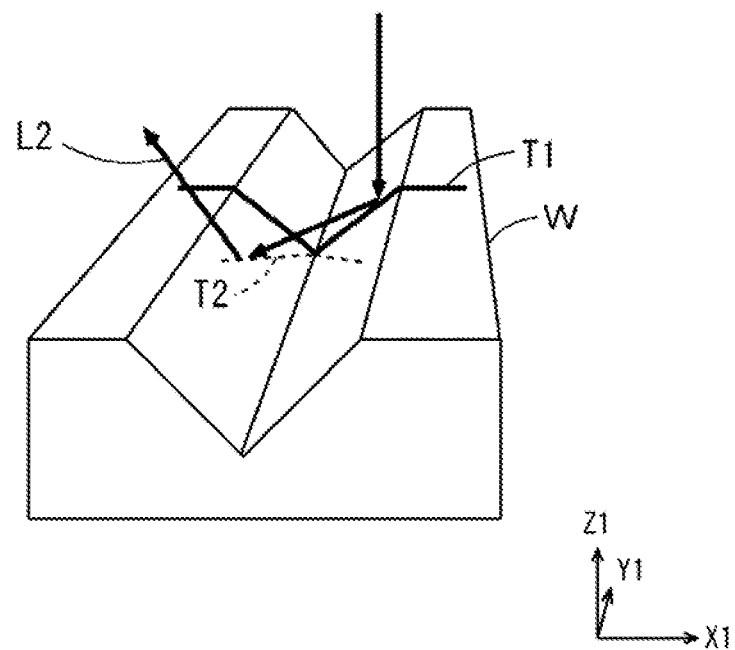
Figure 10:
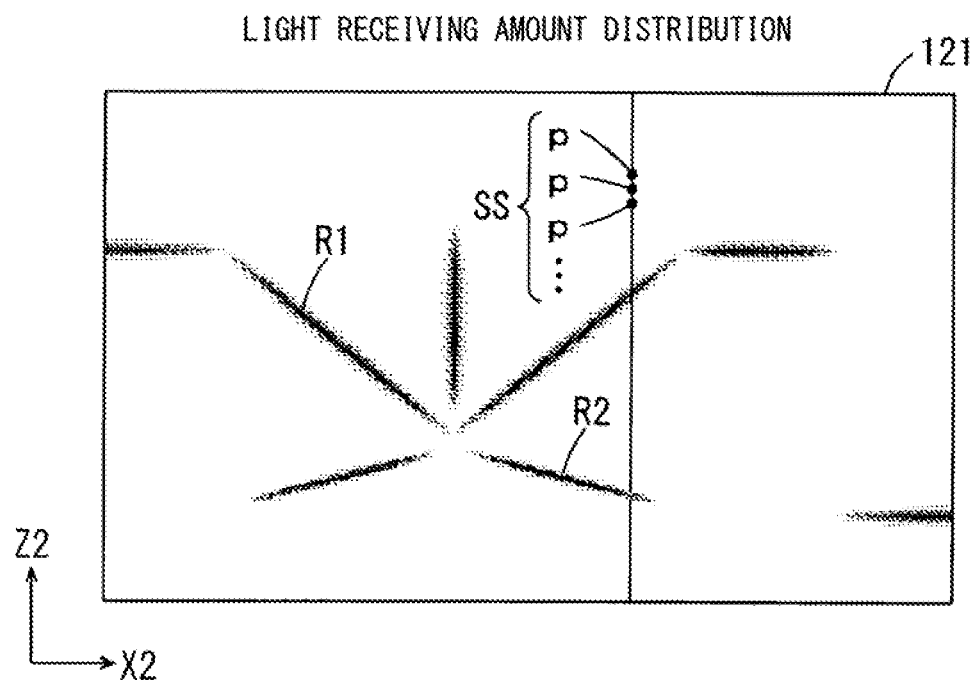
FIG. 10 is a diagram showing another example of the light receiving amount distribution in the light receiving unit.
Figure 11:
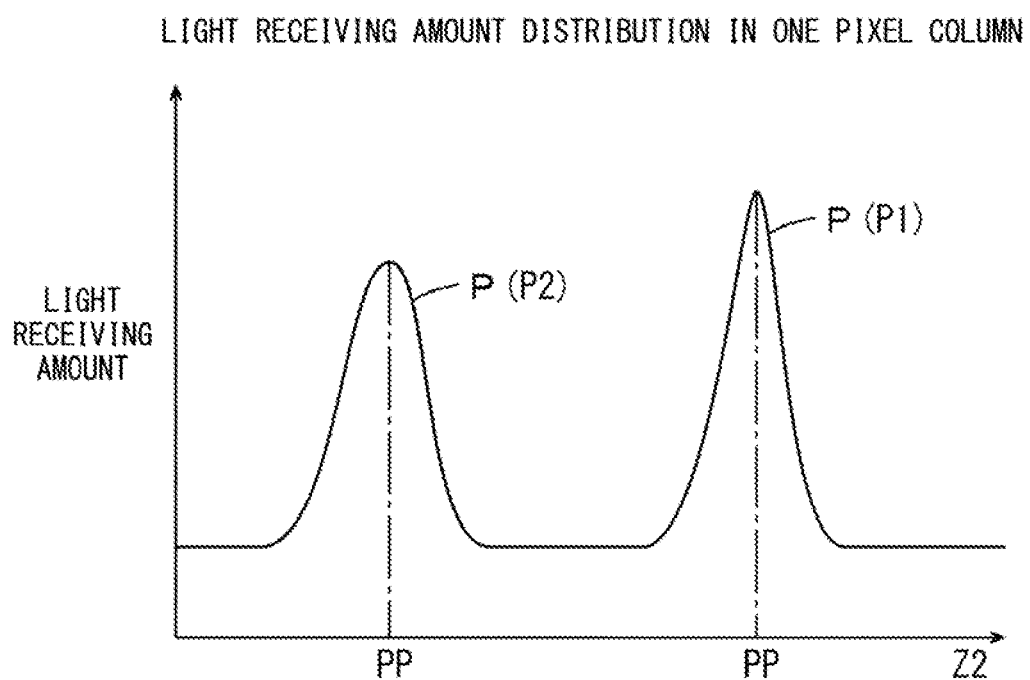
FIG. 11 is a diagram showing a light receiving amount distribution in one pixel column of FIG. 10.

As described above, the light reflected from the irradiation region T1 is incident on the light receiving unit 121, and thus, the peak representing the height of the irradiation region T1 appears in the light receiving amount distribution. However, light reflected from a portion other than the irradiation region T1 may be incident on the light receiving unit 121. In this case, a peak (hereinafter, referred to as a pseudo peak) different from the peak (hereinafter, referred to as a true peak) indicating the height of the irradiation region T1 appears in the light receiving amount distribution. FIGS. 9A and 9B are diagrams for describing reflections on the surface of the workpiece W. FIG. 10 is a diagram showing another example of the light receiving amount distribution in the light receiving unit 121. FIG. 11 is a diagram showing the light receiving amount distribution in one pixel column SS of FIG. 10.

As shown in FIG. 9A, the light irradiated onto the workpiece W is specularly reflected and diffusely reflected from the irradiation region T1. Here, specular reflection refers to reflection in which an incident angle and a reflection angle are equal, and diffuse reflection refers to reflection in which the incident angle and the reflection angle are different. Normally, light specularly reflected from the irradiation region T1 is not incident on the light receiving unit 121, and a part of light L1 diffusely reflected from the irradiation region T1 is incident on the light receiving unit 121. On the other hand, as shown in FIG. 9B, some other light L2 diffusely reflected from the irradiation region T1 may be specularly reflected from another region other than the irradiation region T1 on the surface of the workpiece W (hereinafter, referred to as a pseudo irradiation region T2), and may be incident on the light receiving unit 121.

When the light is specularly reflected, the intensity of the light does not greatly change before and after the reflection. Therefore, a large difference is not generated between the intensity of the light L1 incident on the light receiving unit 121 from the irradiation region T1 and the intensity of the light L2 incident on the light receiving unit 121 from the pseudo irradiation region T2. The present embodiment is an example, and such multiple reflections (reflections caused by multiple times) can be caused under various circumstances. For example, when the workpiece W and the imaging head 100 are arranged such that the specularly reflected light is received by the light receiving unit 121 as the reflected light from the workpiece W, the diffusely reflected light other than the specularly reflected light may be further reflected from another region, and may be received by the light receiving unit 121.

In this case, as shown in FIG. 10, a light receiving amount of another region (hereinafter, referred to as a pseudo light receiving region R2) other than a light receiving region R1 becomes large on the light receiving surface of the light receiving unit 121. Therefore, in addition to a true peak P1 which is a peak P corresponding to the light receiving region R1, a pseudo peak P2 which is a peak P corresponding to the pseudo light receiving region R2 appears in the light receiving amount distribution, as shown in FIG. 11. When not a position of the true peak P1 but a position of the pseudo peak P2 is determined as a peak position PP, accurate profile data cannot be obtained.

In addition, light (disturbance light) from a portion other than the light projecting unit 110 may be incident on the light receiving unit 121. Alternatively, light irradiated onto a portion other than the irradiation region T1 of the workpiece W may be reflected, and may be incident on the light receiving unit 121. In these cases, the pseudo peak P2 in addition to the true peak P1 also appears in the light receiving amount distribution, and thus, the same problem occurs.

Therefore, the profile acquisition unit 224 selectively operates at the time of setting or at the time of measurement. At the time of setting, the profile acquisition unit 224 accepts registration of reference data indicating a reference profile serving as a reference of the profile of the workpiece W. A mask region for indicating a portion at which the light receiving amount is to be ignored in the light receiving amount distribution is set to the reference data. At the time of measurement, the profile acquisition unit 224 determines not the position of the pseudo peak P2 but the position of the true peak P1 as the peak position PP based on the set mask region.

Hereinafter, the operation of the profile acquisition unit 224 will be described in detail. In the following description, the peak position PP in the light receiving amount distribution corresponding to a pixel column SS is simply referred to as the peak position PP of the pixel column SS.

(3) Configuration of Profile Acquisition Unit

Figure 12:
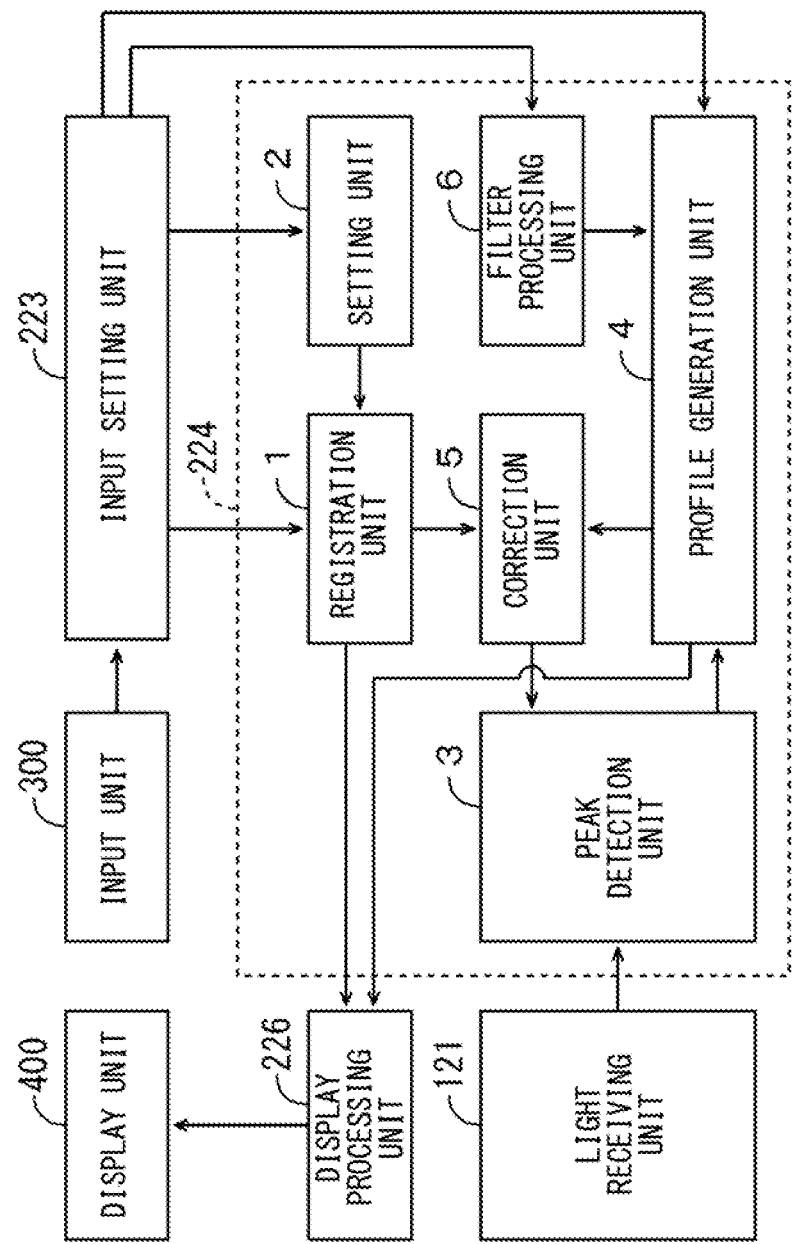
FIG. 12 is a block diagram showing a configuration of a profile acquisition unit.

FIG. 12 is a block diagram showing a configuration of the profile acquisition unit 224. As shown in FIG. 12, the profile acquisition unit 224 includes, as functional units, a registration unit 1, a setting unit 2, a peak detection unit 3, a profile generation unit 4, a correction unit 5, and a filter processing unit 6. The control unit 220 of FIG. 1 executes the measurement program stored in the storage unit 210, thereby realizing the functional units of the profile acquisition unit 224. Part or all of the functional units of the profile acquisition unit 224 may be realized by hardware such as electronic circuits.

At the time of setting, the registration unit 1 registers the reference data based on the command signal supplied from the input setting unit 223. The user can instruct the registration unit 1 to register the reference data through the input setting unit 223 by operating the input unit 300. The reference data may be design data such as computer-aided design (CAD) data of the workpiece W, or may be master profile data generated by measuring a measurement object having the same shape as the workpiece W in advance. The reference profile based on the registered reference data is displayed on the display unit 400 through the display processing unit 226.

At the time of setting, the setting unit 2 sets the mask region to the reference data registered by the registration unit 1 based on the command signal supplied from the input setting unit 223. The user can instruct the setting unit 2 to set the mask region through the input setting unit 223 by operating the input unit 300 while visually recognizing the reference profile displayed on the display unit 400.

The peak detection unit 3 detects the peak position PP of each pixel column SS based on the light receiving amount distribution output from the light receiving unit 121 at the time of measurement. At the time of measurement, the profile generation unit 4 generates profile data indicating the cross-sectional shape of the workpiece W based on the command signal supplied from the input setting unit 223 and the peak position PP of each pixel column SS detected by the peak detection unit 3. The profile data generated at this time is referred to as temporary profile data, and the profile indicated based on the temporary profile data is referred to as a temporary profile.

When unnecessary light is incident on the light receiving unit 121 at the time of generating the temporary profile data, a plurality of peak positions PP is detected by the peak detection unit 3 for any pixel columns SS. In this case, the profile generation unit 4 determines one peak position PP from the plurality of peak positions PP of each pixel column SS based on a preset condition, and generates temporary profile data based on the determined peak position PP.

The preset condition includes "STANDARD (maximum peak)", "NEAR", and "FAR". The user operates the input unit 300, and thus, any one of "STANDARD (maximum peak)", "NEAR", and "FAR" can be set by the input setting unit 223. In "STANDARD (maximum peak)", the position of the peak having the maximum light receiving amount is determined as the peak position PP from the plurality of peaks in each light receiving amount distribution. In the example of FIG. 11, the position of the true peak P1 having the maximum light receiving amount is determined as the peak position PP from the two peaks P.

In "NEAR", the position of the peak closest to one end (for example, left end) in the Z2 direction is determined as the peak position PP from the plurality of peaks in each light receiving amount distribution. In the example of FIG. 11, the position of the pseudo peak P2 appearing on the leftmost side is determined as the peak position PP from the two peaks P2. In "FAR", the peak closest to the other end (e.g., right end) in the Z2 direction is determined as the peak position PP from the plurality of peaks in each light receiving amount distribution. In the example of FIG. 11, the position of the true peak P1 appearing on the rightmost side is determined as the peak position PP from the two peaks P.

In some shapes of the workpiece W, the peak position PP determined based on any condition may coincide with the position of the surface of the workpiece W. Therefore, when the user recognizes an appropriate condition corresponding to the shape of the workpiece W, it is possible to easily generate the temporary profile data that relatively accurately indicates the temporary profile of the workpiece W by setting this condition.

At the time of measurement, the correction unit 5 specifies a positional deviation amount between the reference profile based on the reference data registered by the registration unit 1 and the temporary profile based on the temporary profile data generated by the profile generation unit 4. In addition, the correction unit 5 corrects the position of the mask region for the temporary profile based on the specified positional deviation amount.

At the time of setting, the setting unit 2 can set detection region for detecting a positional deviation between a portion of the temporary profile and the reference profile to the reference data. The user can instruct the setting unit 2 to set the detection region through the input setting unit 223 by operating the input unit 300 while visually recognizing the reference profile displayed on the display unit 400. When the detection region is set to the reference data, the correction unit 5 specifies a positional deviation amount between a portion of the reference profile in the detection region and a portion of the temporary profile corresponding to the portion of the reference profile at the time of specifying the positional deviation amount. In this case, it is possible to easily and quickly specify the positional deviation amount between the reference profile and the temporary profile.

The peak detection unit 3 detects the peak position PP of each pixel column SS again in a state in which the light receiving amount in the mask region whose position has been corrected by the correction unit 5 is excluded at the time of measurement. At the time of measurement, the profile generation unit 4 generates the profile data indicating the profile of the workpiece W again based on the peak position PP detected again by the peak detection unit 3. The profile data generated at this time is referred to as true profile data, and the profile indicated based on the true profile data is referred to as a true profile.

The filter processing unit 6 performs filter processing on the true profile data such that as a change of a value becomes smaller, a smoothing effect becomes larger at each portion of the true profile data generated by the profile generation unit 4. The details of the filter processing unit 6 will be described later. The true profile based on the true profile data generated by the profile generation unit 4 is displayed on the display unit 400 through the display processing unit 226.

(4) Operation of Profile Acquisition Unit

Figure 13:
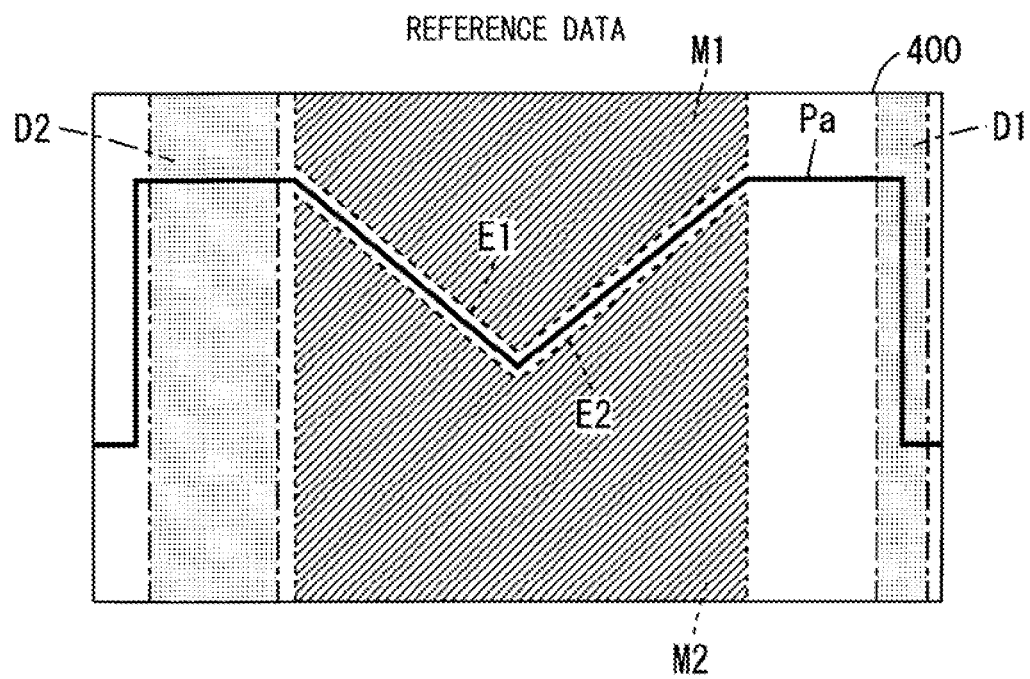
FIG. 13 is a diagram for describing an operation example of the profile acquisition unit.

FIGS. 13 to 18 are diagrams for describing an operation example of the profile acquisition unit 224. As shown in FIG. 13, a reference profile Pa based on the reference data registered in the registration unit 1 of FIG. 12 is displayed on the display unit 400 at the time of setting. In FIG. 13, the reference profile Pa is illustrated by a thick solid line. The same applies to FIG. 15.

The user performs an operation for setting the mask region by using the input unit 300 of FIG. 12 while visually recognizing the reference profile Pa displayed on the display unit 400. As a result, the mask region is set to the reference data by the setting unit 2 of FIG. 12. A plurality of mask regions can be set, and two mask regions M1 and M2 are set in this example. In FIG. 13, the mask regions M1 and M2 are illustrated by dotted lines and hatching patterns. The same applies to FIGS. 16 and 17.

As a specific example of a setting procedure of the mask regions M1 and M2, the user can select any one of an "upper mask region" and a "lower mask region" at the time of setting the mask regions M1 and M2. The mask region M1 corresponds to the "upper mask region". The mask region M2 corresponds to the "lower mask region".

Specifically, the user designates a line E1 indicating a lower edge of the mask region M1 by selecting the "upper mask region" and performing an operation such as drawing using the display unit 400. As a result, a region above the designated line E1 is set as the mask region M1. Similarly, the user designates a line E2 indicating an upper edge of the mask region M2 by selecting the "lower mask region" and performing the operation such as drawing using the display unit 400. As a result, a region below the designated line E2 is set as the mask region M2.

In addition, the user selects any one of "X correction", "Z correction", "XZ correction" and "ZX correction" as a method of correcting the mask region. The "X correction" is a method of correcting the position of the mask region in an X2 direction. The "Z correction" is a method of correcting the position of the mask region in the Z2 direction. The "XZ correction" is a method of correcting the position of the mask region in the X2 direction and then correcting the position in the Z2 direction. The "ZX correction" is a method of correcting the position of the mask region in the Z2 direction and then correcting the position in the X2 direction. In this example, the "XZ correction" is selected.

Further, the user performs an operation for setting the detection region by using the input unit 300 while visually recognizing the reference profile Pa displayed on the display unit 400. As a result, the detection region is set to the reference data by the setting unit 2. In this example, a detection region D1 for detecting a positional deviation in the X2 direction and a detection region D2 for detecting a positional deviation in the Z2 direction are set. In FIG. 13, the detection regions D1 and D2 are illustrated by dashed dotted lines and dot patterns. The same applies to FIG. 15.

Here, a representative value of the reference data corresponding to the reference profile Pa in the X2 direction within the detection region D1 and a representative value of the reference data corresponding to the reference profile Pa in the Z2 direction within the detection region D2 are calculated by the correction unit 5 in FIG. 12. The representative value in the X2 direction is, for example, an average value in the X2 direction. The representative value in the Z2 direction is, for example, an average value in the Z2 direction. When a peak portion or a bottom portion of the reference profile Pa is included in the detection region D2, the representative value in the Z2 direction may be a peak value or a bottom value.

Figure 14:
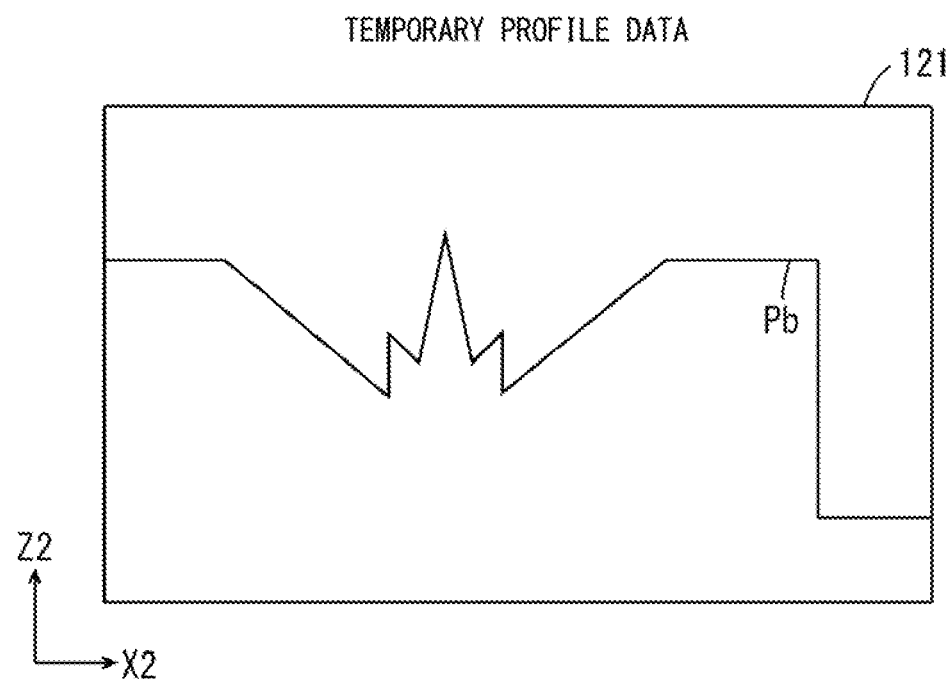
FIG. 14 is a diagram for describing the operation example of the profile acquisition unit.
Figure 15:
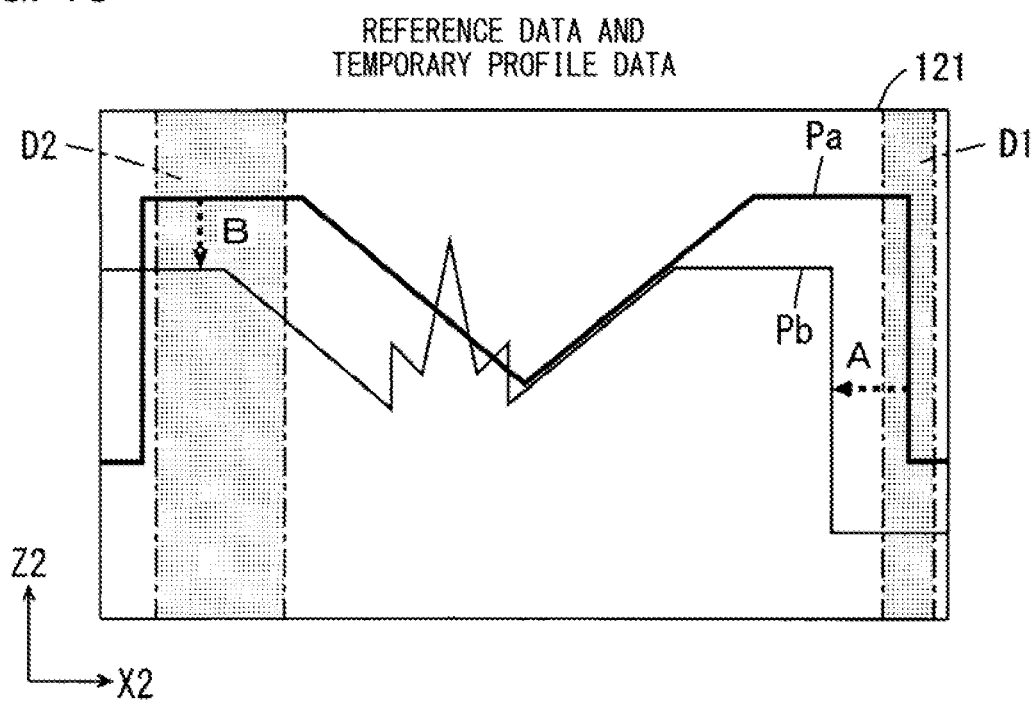
FIG. 15 is a diagram for describing the operation example of the profile acquisition unit.

Subsequently, it is considered that the light receiving unit 121 of FIG. 12 outputs the light receiving amount distribution shown in FIG. 10 at the time of measurement. In this case, the peak position PP of each pixel column SS is detected by the peak detection unit 3 of FIG. 12 based on the light receiving amount distribution of FIG. 10. In addition, the temporary profile data is generated by the profile generation unit 4 of FIG. 12 based on the detected peak position PP. A temporary profile Pb based on the generated temporary profile data is shown in FIG. 14.

Subsequently, the correction unit 5 specifies the positional deviation amount in the X2 direction between the reference profile Pa and the corresponding portion of the temporary profile Pb in the detection region D1 based on the representative value in the X2 direction in the detection region D1. The reference data is corrected by the correction unit 5 based on the specified positional deviation amount. As a result, the reference profile Pa moves in the X2 direction as indicated by a dotted arrow A in FIG. 15.

Thereafter, the correction unit 5 specifies the positional deviation amount in the Z2 direction between the reference profile Pa and the corresponding portion of the temporary profile Pb in the detection region D2 based on the representative value in the Z2 direction in the detection region D2. The reference data is corrected by the correction unit 5 based on the specified positional deviation amount. As a result, the reference profile Pa moves in the Z2 direction as indicated by a dotted arrow B in FIG. 15.

Figure 16:
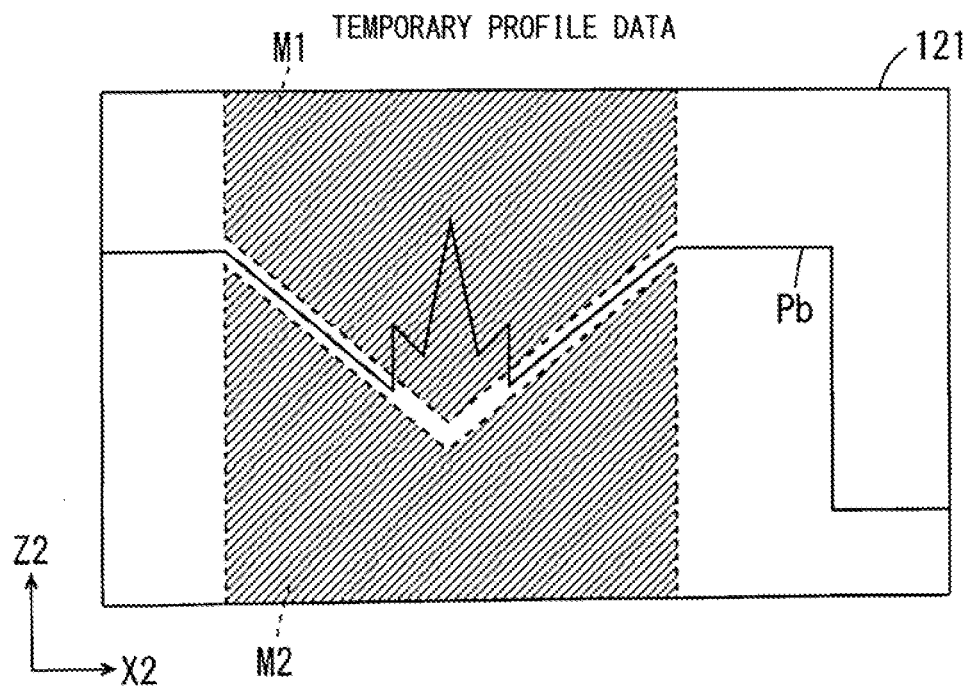
FIG. 16 is a diagram for describing the operation example of the profile acquisition unit.
Figure 17:
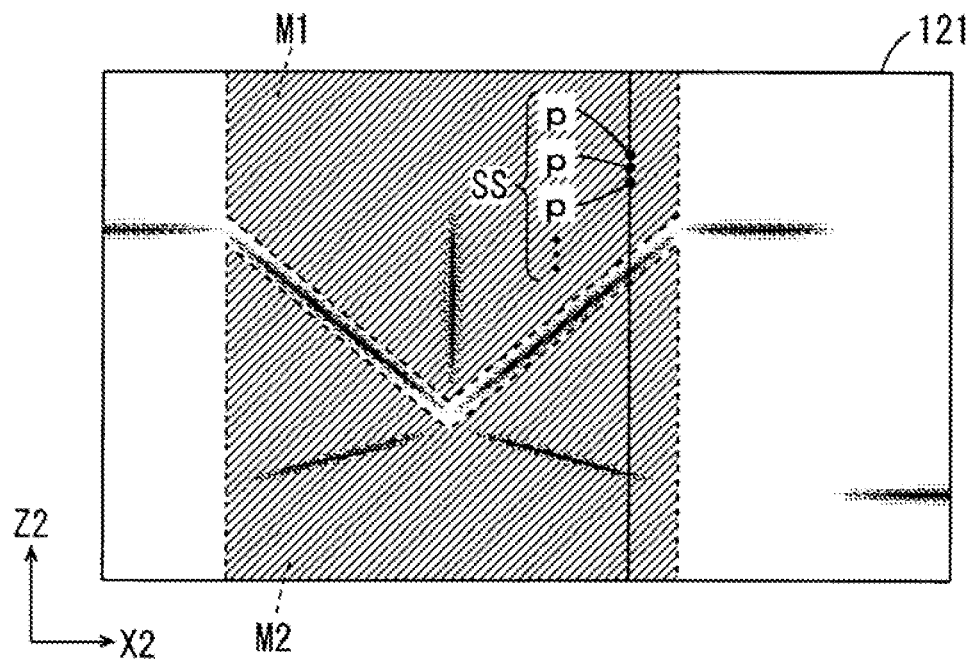
FIG. 17 is a diagram for describing the operation example of the profile acquisition unit.

In this manner, the reference profile Pa moves so as to overlap with the temporary profile Pb, and the mask regions M1 and M2 move in accordance with the reference profile Pa. Thus, the positions of the mask regions M1 and M2 are corrected. FIG. 16 shows a positional relationship between the corrected mask regions M1 and M2 and the temporary profile Pb. FIG. 17 shows a positional relationship between the corrected mask regions M1 and M2 and the light receiving amount distribution. Although it has been described in the above example that the reference data is corrected such that the reference profile Pa overlaps with the temporary profile Pb, the temporary profile data may be corrected such that the temporary profile Pb overlaps with the reference profile Pa.

Figure 18:
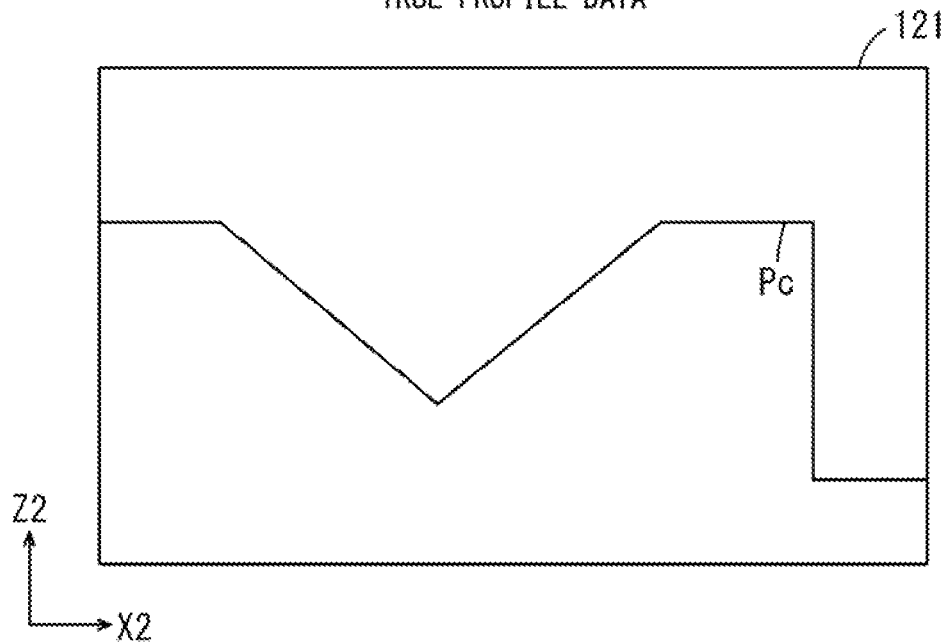
FIG. 18 is a diagram for describing the operation example of the profile acquisition unit.

Subsequently, the peak position PP of each pixel column SS is detected again by the peak detection unit 3 in a state in which the light receiving amounts in the mask regions M1 and M2 of FIG. 17 whose positions have been corrected are excluded. Subsequently, true profile data is generated by the profile generation unit 4 based on the peak position PP detected again. A true profile Pc based on the generated true profile data is shown in FIG. 18.

(5) Filter Processing Unit

Figure 19A:
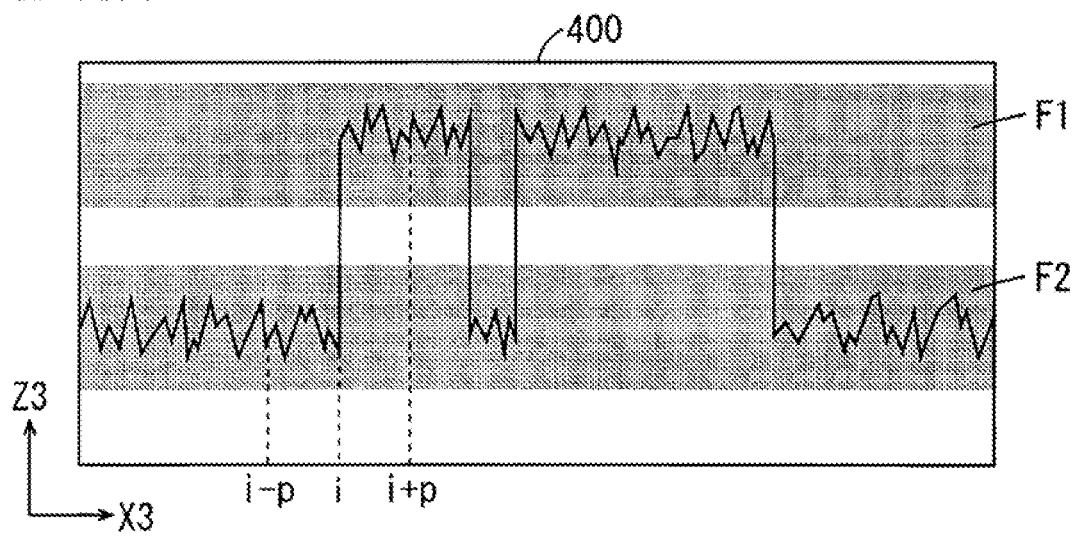
FIGS. 19A to 19C are diagrams for describing an operation of a filter processing unit of FIG. 12.
Figure 19B:
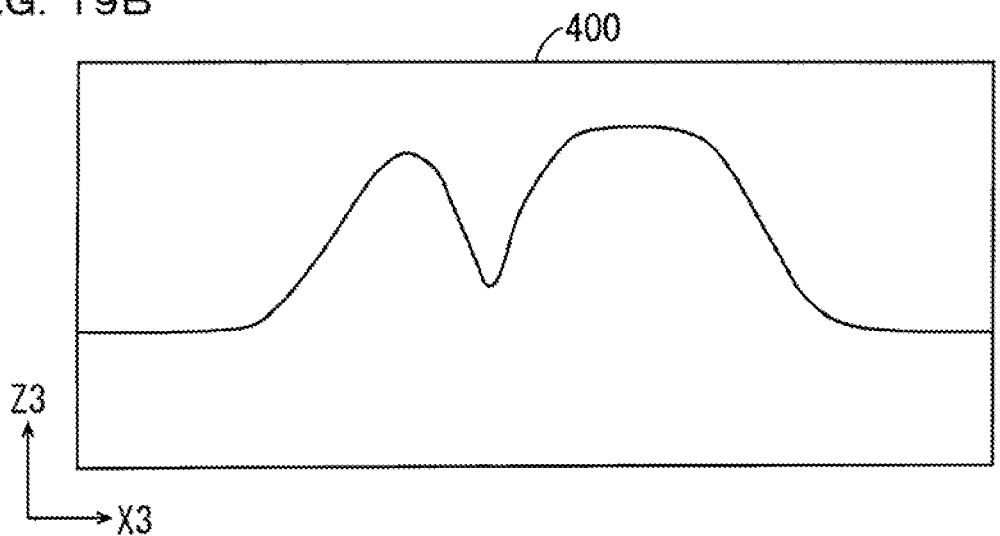
Figure 19C:
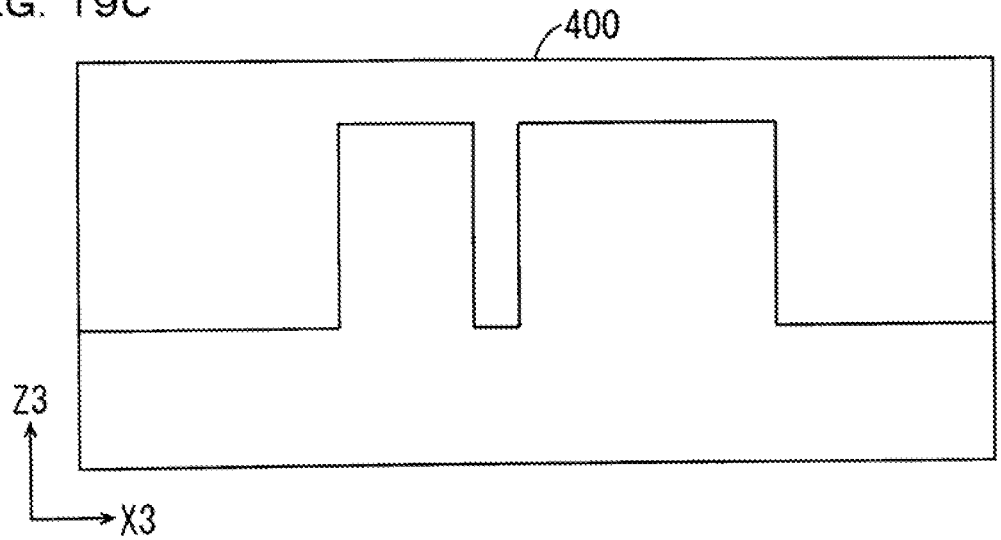

FIGS. 19A to 19C are diagrams for describing the operation of the filter processing unit 6 of FIG. 12. In FIGS. 19A to 19C, the true profile of the workpiece W is displayed on the display unit 400. An X3 direction and a Z3 direction which respectively correspond to the X2 direction and the Z2 direction of the light receiving unit 121 of FIG. 1 are defined on a screen of the display unit 400.

Even when the portion of the workpiece W is flat, the portion of the true profile of the workpiece W based on the true profile data may not be flat and may become jagged, as shown in FIG. 19A, in some states of the surface, color unevenness, or the like of the workpiece W. When smoothing filter processing is performed on the true profile data in order to smooth the portion of the true profile of the workpiece W, a stepped portion or an edge portion of the true profile disappears as shown in FIG. 19B, and an accurate true profile may not be obtained.

Therefore, in the present embodiment, the filter processing unit 6 calculates an output value $f_i$ by calculating the following Expression (1). Here, assuming that the plurality of pixel columns SS arranged in the X3 direction is numbered by i-th (i is an integer of 1 or more) in order from the left side, $z_i$ is a position (height) of a portion of the true profile data in the Z3 direction which corresponds to the i-th pixel column SS in Expression (1). α is a weighting parameter in the Z3 direction. k is an integer of 1 or more, and represents a range (kernel) in which the calculation is performed for the numbers i.

$$f_i = \frac{\sum_{j=i-k}^{i+k} e^{-\alpha(z_i-z_j)^2} \cdot z_j}{\sum_{j=i-k}^{i+k} e^{-\alpha(z_i-z_j)^2}} \quad (1)$$

The output value $f_i$ of Expression (1) is calculated for all the numbers i, and thus, the filter processing is performed on the true profile data such that a smoothing effect at a portion of the true profile at which a height change is smaller is larger than a smoothing effect at a portion at which the height change becomes larger. As a result, the true profile is smoothed while shapes of the stepped portion and the edge portion are maintained, as shown in FIG. 19C.

The filter processing unit 6 may calculate the output value $f_i$ by calculating the following Expression (2) instead of Expression (1). Here, $x_i$ in Expression (2) is a position of a portion of the true profile data in the X3 direction which corresponds to the i-th pixel column SS. β is a weighting parameter in the X3 direction. The other parameters are the same as the parameters in Expression (1).

$$f_i = \frac{\sum_{j=i-k}^{i+k} e^{-\beta(x_i-x_j)^2} \cdot e^{-\alpha(z_i-z_j)^2} \cdot z_j}{\sum_{j=i-k}^{i+k} e^{-\beta(x_i-x_j)^2} \cdot e^{-\alpha(z_i-z_j)^2}} \quad (2)$$

The output value $f_i$ of Expression (2) is calculated for all the numbers i, and thus, the filter processing is performed on the true profile data such that a smoothing effect at a portion of the true profile at which the height change is smaller is larger than a smoothing effect at a portion at which the height change becomes larger. The filter processing is performed on the true profile data such that a smoothing effect between portions of the true profile which are adjacent to each other in the X3 direction is larger than a smoothing effect between portions which are spaced apart from each other in the X3 direction.

In addition, the user can specify the range of the true profile data to be subjected to the filter processing in the Z3 direction by operating the input unit 300. It is also possible to specify a plurality of ranges in which the filter processing is performed. FIG. 19A shows an example in which two ranges F1 and F2 to be subjected to filter processing are specified by dot patterns.

In Expression (1) or Expression (2), the kernel k may be set as a Gaussian kernel in the input setting unit 223 of FIG. 1 or may be set in the input setting unit 223 by the user who operates the input unit 300 of FIG. 1. Alternatively, when the measurement processing unit 225 of FIG. 1 is set so as to measure a predetermined stepped portion of the true profile, the kernel k may be automatically set in the input setting unit 223 according to the size of the stepped portion.

(6) Effects

In the optical displacement meter 500 according to the present embodiment, the reference data indicating the reference profile Pa serving as the reference of the profile of the workpiece W is registered by the registration unit 1 at the time of setting. In addition, the mask regions M1 and M2 for indicating the portions in which the light receiving amounts are to be ignored in the light receiving amount distribution output from the light receiving unit 121 are set to the reference data by the setting unit 2.

At the time of measurement, the workpiece W is irradiated with the band-shaped light which spreads in the X1 direction by the light projecting unit 110. The reflected light from the workpiece W is reflected by the plurality of pixel columns SS arranged in the X2 direction in the light receiving unit 121, and the light receiving amount distribution is output. In each pixel column SS, a plurality of pixels p is arranged in the Z2 direction. The peak detection unit 3 detects the position of the peak of the light receiving amount in the Z2 direction for each pixel column SS based on the plurality of light receiving amount distributions output from the plurality of pixel columns SS. The temporary profile data of the workpiece W is generated by the profile generation unit 4 based on the position of the peak in each of the plurality of detected light receiving amount distributions.

Thereafter, the positional deviation amount between the reference profile Pa and the temporary profile Pb is specified by the correction unit 5, and the positions of the mask regions M1 and M2 for the temporary profile Pb are corrected based on the specified positional deviation amount. The position of the peak in the Z2 direction is detected again by the peak detection unit 3 by excluding the light receiving amounts in the mask regions M1 and M2 corrected from each of the plurality of light receiving amount distributions corresponding to the plurality of pixel columns SS. The true profile data of the workpiece W is generated by the profile generation unit 4 based on the position of the peak detected again.

With this configuration, when an unnecessary peak occurs in the light receiving amount distribution, it is possible to generate the true profile data indicating the true profile Pc of the workpiece W while ignoring the light receiving amounts in the mask regions by setting the mask regions M1 and M2 to the portions of the reference profile Pa corresponding to the portions of the light receiving amount distribution. Here, the temporary profile data indicating the temporary profile Pb of the workpiece W is generated before the true profile data is generated. Therefore, even when the positional deviation occurs on the workpiece W for the reference profile Pa, the positions of the mask regions M1 and M2 are corrected based on the positional deviation between the reference profile Pa and the temporary profile Pb, and the mask regions M1 and M2 move in accordance with the positional deviation of the workpiece W.

Therefore, even when a positional deviation occurs in the workpiece W, a portion at which an unnecessary peak occurs is prevented from moving out of the mask regions M1 and M2. Similarly, a portion at which the unnecessary peak does not occur is prevented from moving into the mask regions M1 and M2. As a result, the mask regions M1 and M2 can be set up to the nearest of the reference profile Pa in a range that does not overlap with the reference profile Pa. As a result, even when an unnecessary peak occurs in the light receiving amount distribution, it is possible to accurately measure the profile of the workpiece W.

(7) Correspondence Between Elements of Claims and Elements of Embodiments

Hereinafter, an example of correspondence between elements of Claims and the elements of the embodiments will be described, but the present invention is not limited to the following example. Various other elements having configurations or functions described in Claims may be used as the elements of Claims.

The workpiece W is an example of a measurement object, the optical displacement meter 500 is an example of an optical displacement meter, the light projecting unit 110 is an example of a light projecting unit, the X2 direction is an example of a first direction, and the Z2 direction is an example of a second direction. The pixel p is an example of a pixel, the pixel column SS is an example of a pixel column, the light receiving unit 121 is an example of a light receiving unit, the registration unit 1 is an example of a registration unit, and the mask regions M1 and M2 are examples of mask regions. The setting unit 2 is an example of a setting unit, the peak detection unit 3 is an example of a peak detection unit, the profile generation unit 4 is an example of a profile generation unit, the correction unit 5 is an example of a correction unit, and the filter processing unit 6 is an example of a filter processing unit.

What is claimed is:

1. An optical displacement meter using an optical cutting method, which measures a profile of a measurement object, the meter comprising:
   a light projecting unit that irradiates the measurement object with split light which spreads in a first direction or spot light scanned in the first direction;
   a light receiving unit that includes a plurality of pixels arranged in the first direction and a second direction intersecting with the first direction, receives reflected light from each position of the measurement object in the first direction, and outputs a light receiving amount distribution;
   a registration unit that registers reference data indicating a reference profile serving as a reference of the profile of the measurement object at the time of setting;
   a setting unit that sets a mask region for indicating a portion at which a light receiving amount is to be ignored in the light receiving amount distribution output from the light receiving unit to the reference data at the time of setting;
   a peak detection unit that detects a position of a peak of a light receiving amount in the second direction in each pixel column based on a plurality of light receiving amount distributions respectively output from a plurality of pixel columns arranged in the first direction at the time of measurement;
   a profile generation unit that generates temporary profile data of the measurement object based on a position of a peak in each of the plurality of light receiving amount distributions detected by the peak detection unit at the time of measurement; and
   a correction unit that specifies a positional deviation amount between the reference profile and a temporary profile based on the temporary profile data, and corrects a position of the mask region for the temporary profile based on the specified positional deviation amount at the time of measurement,
   wherein the peak detection unit detects the position of the peak in the second direction again by excluding the light receiving amount in the mask region corrected by the correction unit from each of the plurality of light receiving amount distributions which respectively corresponds to the plurality of pixel columns at the time of measurement, and
   the profile generation unit generates true profile data of the measurement object based on the position of the peak detected again by the peak detection unit at the time of measurement.

2. The optical displacement meter according to claim 1,
   wherein the setting unit further sets a detection region for detecting a positional deviation between a portion of the temporary profile and the reference profile to the reference data at the time of setting, and
   the correction unit specifies a positional deviation amount between a portion of the reference profile within the detection region and a portion of the temporary profile corresponding to the portion of the reference profile at the time of measurement.

3. The optical displacement meter according to claim 1,
   wherein, at the time of measurement, when positions of a plurality of the peaks are detected for the light receiving amount distribution corresponding to any pixel column by the peak detection unit, the profile generation unit determines one peak position from the positions of the plurality of peaks in the light receiving amount distribution based on a preset condition, and generates the temporary profile data based on the determined position of the peak.

4. The optical displacement meter according to claim 3,
   wherein the preset condition includes a condition in which a position of a peak having a maximum light receiving amount is determined as the position of the one peak from the positions of the plurality of peaks in each light receiving amount distribution.

5. The optical displacement meter according to claim 3,
   wherein the preset condition further includes a condition in which a position of a peak closest to one end or the other end in the second direction is determined as the position of the one peak from the positions of the plurality of peaks in each light receiving amount distribution.

6. The optical displacement meter according to claim 1, further comprising:
   a filter processing unit that performs filter processing on the true profile data such that a smoothing effect becomes larger as a change of a value becomes smaller at each portion of the true profile data generated by the profile generation unit.

* * * * *